(12) United States Patent
Henschel et al.

(10) Patent No.: US 8,295,664 B2
(45) Date of Patent: Oct. 23, 2012

(54) INTEGRATED OPTICAL SPLITTER SYSTEM

(75) Inventors: James J. Henschel, Blackstone, MA (US); David W. Stowe, Milford, MA (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 12/284,716

(22) Filed: Sep. 23, 2008

(65) Prior Publication Data

US 2009/0202206 A1  Aug. 13, 2009

Related U.S. Application Data

(63) Continuation of application No. 11/365,762, filed on Feb. 28, 2006, now Pat. No. 7,428,357, which is a continuation of application No. 10/265,186, filed on Oct. 4, 2002, now Pat. No. 7,006,737.

(60) Provisional application No. 60/327,533, filed on Oct. 5, 2001.

(51) Int. Cl.
*G02B 6/42* (2006.01)
*G02B 6/26* (2006.01)

(52) U.S. Cl. .......................... 385/48; 385/30

(58) Field of Classification Search ............ 385/30, 385/48
See application file for complete search history.

(56) References Cited

U.S. PATENT DOCUMENTS

| | | | | |
|---|---|---|---|---|
| 4,593,968 A | * | 6/1986 | Giallorenzi | 385/51 |
| 4,787,692 A | | 11/1988 | Spanke | |
| 4,869,570 A | * | 9/1989 | Yokohama et al. | 385/24 |
| 4,943,136 A | * | 7/1990 | Popoff | 385/46 |
| 5,268,014 A | * | 12/1993 | Miller et al. | 65/410 |
| 5,361,382 A | * | 11/1994 | Nakamura et al. | 385/49 |
| 5,447,585 A | | 9/1995 | Dannoux et al. | |
| 5,459,804 A | * | 10/1995 | Stowe | 385/42 |
| 5,500,917 A | * | 3/1996 | Daniel et al. | 385/99 |
| 5,627,930 A | * | 5/1997 | Ishiguro et al. | 385/51 |
| 5,682,453 A | * | 10/1997 | Daniel et al. | 385/99 |
| 5,778,120 A | | 7/1998 | Asakura et al. | |
| 6,563,971 B1 | * | 5/2003 | Burton et al. | 385/15 |
| 6,600,860 B2 | * | 7/2003 | Sun et al. | 385/115 |
| 6,760,495 B2 | * | 7/2004 | Gonthier et al. | 385/11 |
| 6,836,599 B2 | * | 12/2004 | Gonthier | 385/43 |
| 6,873,773 B2 | * | 3/2005 | Sun et al. | 385/115 |
| 6,951,425 B2 | * | 10/2005 | Vergeest | 385/59 |
| 7,006,737 B2 | | 2/2006 | Henschel et al. | |
| 7,428,357 B2 | | 9/2008 | Henschel et al. | |
| 2002/0024727 A1 | * | 2/2002 | Wilcox et al. | 359/342 |
| 2003/0016925 A1 | * | 1/2003 | Sun et al. | 385/115 |
| 2003/0048991 A1 | * | 3/2003 | Gonthier | 385/43 |
| 2003/0063833 A1 | * | 4/2003 | Gonthier et al. | 385/11 |
| 2003/0198446 A1 | * | 10/2003 | Sun et al. | 385/115 |

FOREIGN PATENT DOCUMENTS

JP  07333457 A  * 12/1995

* cited by examiner

*Primary Examiner* — K. Cyrus Kianni

(74) *Attorney, Agent, or Firm* — Merchant & Gould P.C.

(57) ABSTRACT

A system and method directed to an integrated fiber optic splitter assembly having at least two fused splitters disposed in a common substrate. An integrated optical splitter assembly includes a plurality of input fibers, a plurality of output fibers, and a plurality of splitters disposed on a single substrate to either split or couple optical signals between the input and output optical fibers.

8 Claims, 9 Drawing Sheets

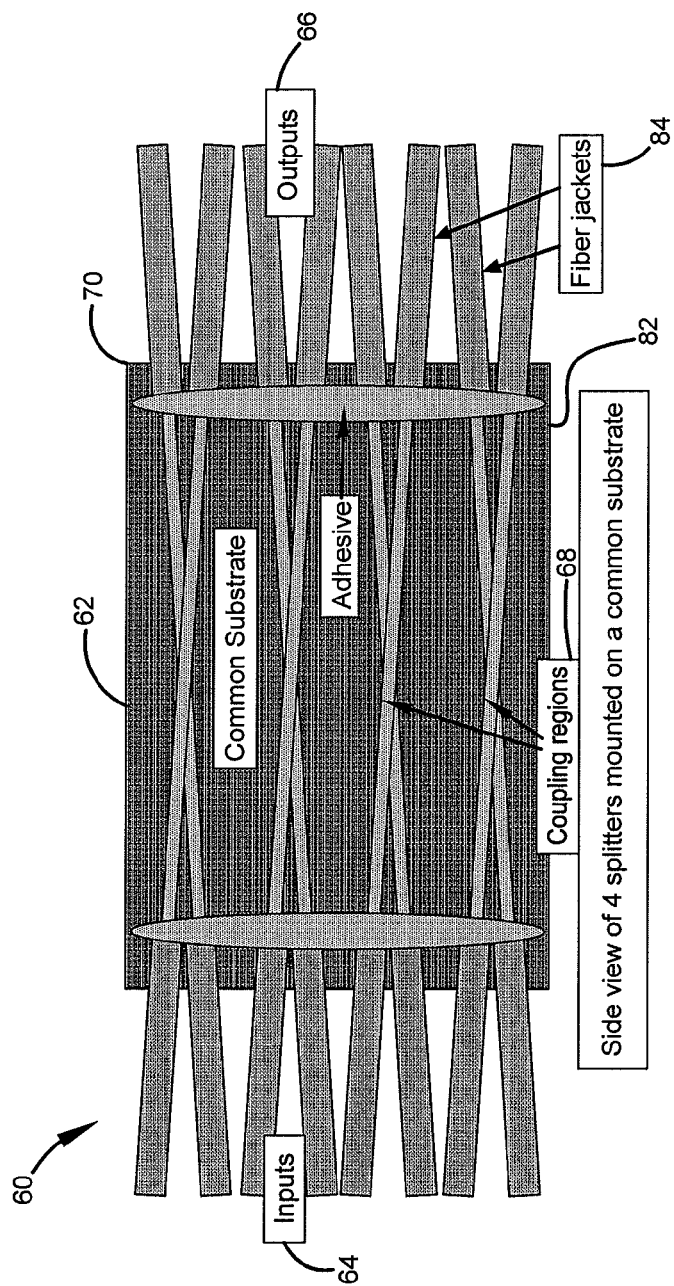
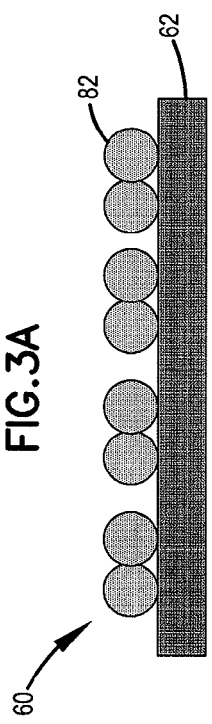
FIG.3A — Side view of 4 splitters mounted on a common substrate
FIG.3B — Cross section of 4 splitters mounted on a common substrate 4 splitters mounted on a common grooved substrate Rectangular housing surrounding 4 splitters mounted on a common grooved substrate Rectangular housing surrounding 4 splitters mounted on a common grooved substrate with a top cover substrate

INTEGRATED OPTICAL SPLITTER SYSTEM

CROSS REFERENCES TO RELATED APPLICATIONS

The present application is a continuation of. U.S. patent application Ser. No. 11/365,762, filed Feb. 28, 2006, now U.S. Pat. No. 7,428,357, which is a continuation of U.S. Pat. application Ser. No. 10/265,186, filed Oct. 4, 2002, now U.S. Pat. No. 7,006,737, which claims the benefit of U.S. Patent Application No. 60/327,533, filed Oct. 5, 2001, which applications are hereby incorporated by reference in their entirety.

BACKGROUND OF THE INVENTION

With the evolution of optical networks, the need for multiple distribution of optical signals is crucial. Single mode and multimode splitters are used to split light with minimal loss from one to two fibers or to combine light from two fibers into one fiber. The current fiber optic splitter assemblies include packaged 1×2 or 2×2 splitters which are encased in a stainless steel tube. FIGS. 1A and 1B illustrate the typical cross-sectional and side-views respectively of a single splitter. The package 10 consists of an optical splitter 12 including fused fibers. The splitter 12 is attached to the fused silica substrate 14 by an epoxy bond at each end. The substrate is then encased in a chemically-inert thermoplastic such as, for example, a cylindrical Fluorinated Ethylene Propylene (FEP) tubing 16 to provide protection from contamination or damage prior to inserting the assembly 10 into the concentric stainless steel tubing 18. One or two fibers from the splitter emerge from each end of the stainless tubing. This package 10 is expensive and bulky especially if more than one splitter is required in an optical circuit. Currently, if more than one splitter is required, several of these splitter-assemblies 10 are disposed side by side as shown in FIG. 2. There are several disadvantages to the current fiber optic splitters. It takes considerable space in a box or on a circuit board to mount each of the discrete splitters. The individual splitter packages are expensive. If it is desired to organize the splitter leads so that all input fibers, output fibers, or tap legs are grouped with their companion splitters, this grouping cannot be reasonably achieved until each of the splitters is mounted in a larger structure or box which holds the splitters in the desired juxtaposition.

SUMMARY OF THE INVENTION

The system and method of the present invention is directed to an integrated fiber optic splitter assembly having at least two fused splitters disposed in a common substrate.

A preferred embodiment of an integrated optical splitter assembly of the present invention includes a plurality of input fibers, a plurality of output fibers, and a plurality of splitters disposed on a single substrate to either split or couple optical signals between the input and output optical fibers.

In accordance with another aspect of the present invention, a system for an integrated splitter assembly includes a plurality of the optical assemblies disposed in a housing and oriented such that the throughput fibers are grouped in one direction and the coupling fibers are arranged in a second direction.

In an embodiment, the integrated optical splitter assembly has a substrate having a plurality of grooves. The assembly has a plurality of first optical fibers. Each fiber extends through a groove on the substrate. An optical splitter is each disposed in at least a plurality of the grooves of the substrate. The optical splitter splits and/or couples optical signals between the first optical fiber and a second optical fiber.

In one embodiment, the assembly is packaged within an external housing. The external housing is a rectangular metal tube. In an embodiment, the assembly has a secondary substrate wherein the optical splitters are interposed the substrate and the secondary substrate.

In an embodiment, the integrated optical splitter assembly has a plurality of first optical fibers and a plurality of second optical fibers. A plurality of optical splitters are disposed on the substrate for at least one of splitting and coupling optical signals between the first optical fibers and the second optical fibers.

In one embodiment, the substrate has a channel for receiving at least two optical splitters and further comprising a housing surrounding the substrate. In one embodiment, the first optical fibers and the second optical fibers extend beyond the substrate. In an alternative embodiment, one of the first optical fibers and the second optical fiber terminates at the optical splitter.

A method of forming an integrated optical splitter assembly according to the invention includes the steps of providing a substrate having a surface and at least one edge, locating a plurality of first optical fibers extending over the surface of the substrate, and locating a plurality of second optical fibers extending over the surface of the substrate. A plurality of optical splitters are formed overlying the substrate. Each optical splitter joins a first optical fiber to a second optical fiber for at least one of splitting and coupling optical signals.

In one method of the forming the assembly, the optical fibers are secured to the substrate. In one embodiment, the securing is done by adhesive.

One method of method of the forming the assembly includes interposing the optical splitters between the substrate and a secondary substrate. The substrate and the optical splitters are surrounded with an external housing.

In one method, a plurality of grooves are formed in the substrate to receive the optical splitters and a segment of the first and the second optical fibers.

The foregoing and other features and advantages of the integrated optical splitter system will be apparent from the following more particular description of preferred embodiments of the system and method as illustrated in the accompanying drawings in which like reference characters refer to the same parts throughout the different views.

BRIEF DESCRIPTION OF THE DRAWINGS

FIG. 3A illustrates a side view of a preferred embodiment including a plurality of splitters mounted on a common substrate;

FIG. 3B illustrates a cross-sectional view of the preferred embodiment of the splitter assembly described with respect to FIG. 3A;

Figure 1:
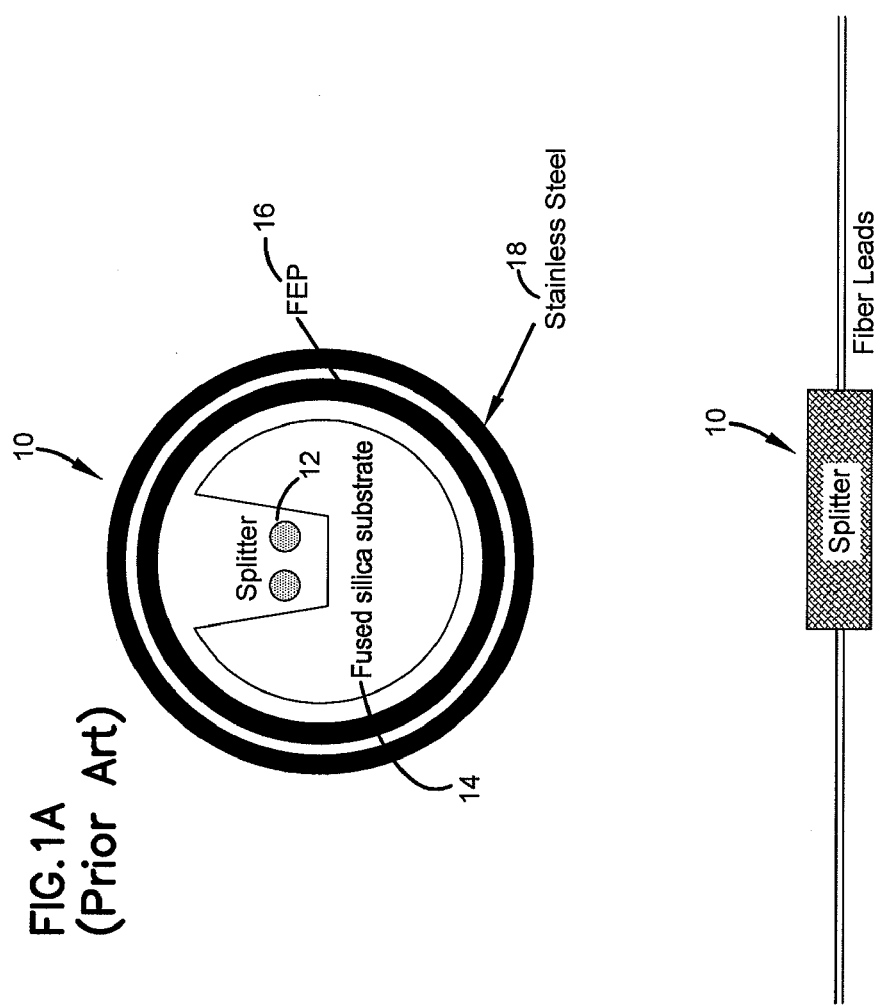
FIGS. 1A and 1B illustrate respectively a cross-sectional view and a side view of a prior art splitter assembly.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

The system of the present invention is directed at an integrated splitter assembly including at least two fused optical splitters disposed on the same substrate or within the same assembly. As referenced herein a splitter assembly may also function as and be interchangeable with a coupling assembly.

Splitting and coupling may be required during installation, during service and on interminal equipment. In applications requiring transporting of an optical signal from a central location to a distribution location splitting of the fiber carrying the optical signal to feed multiple subscribers may also be necessary. Splitter modules can also be used for diagnostic purposes by monitoring one of the multiple output signals without interrupting services.

In a preferred embodiment of the present invention the individual fibers comprising the splitters are all attached to a common substrate rather than attaching each splitter to its own substrate. FIGS. 3A and 3B are side and cross-sectional views respectively of a preferred embodiment of a splitter assembly 60 in accordance with the present invention. The splitter assembly 60 has a common substrate 62. The splitter assembly 60 has a plurality of inputs 64 entering on one side 70 and a plurality of outputs 66 exiting on the opposite side 70. The fibers 82 of the inputs 64 and the outputs 66 are split or coupled in a coupling region 68 that overlies the substrate 62. The fibers 82 are secured to the substrate 62 with an adhesive 74. The common substrate 62 of the splitter assembly 60 is then packaged within an external housing such as a rectangular metal tube, as discussed below. The fibers 82 each have a fiber jacket 84 protecting the fiber outside the splitter assembly 60.

Referring to FIG. 3B, a cross section of the splitter assembly 60 of FIG. 3A is shown. The fibers 82 are shown on the substrate 62 with the two fibers 82 of each splitter adjacent to each other.

Figure 4A:
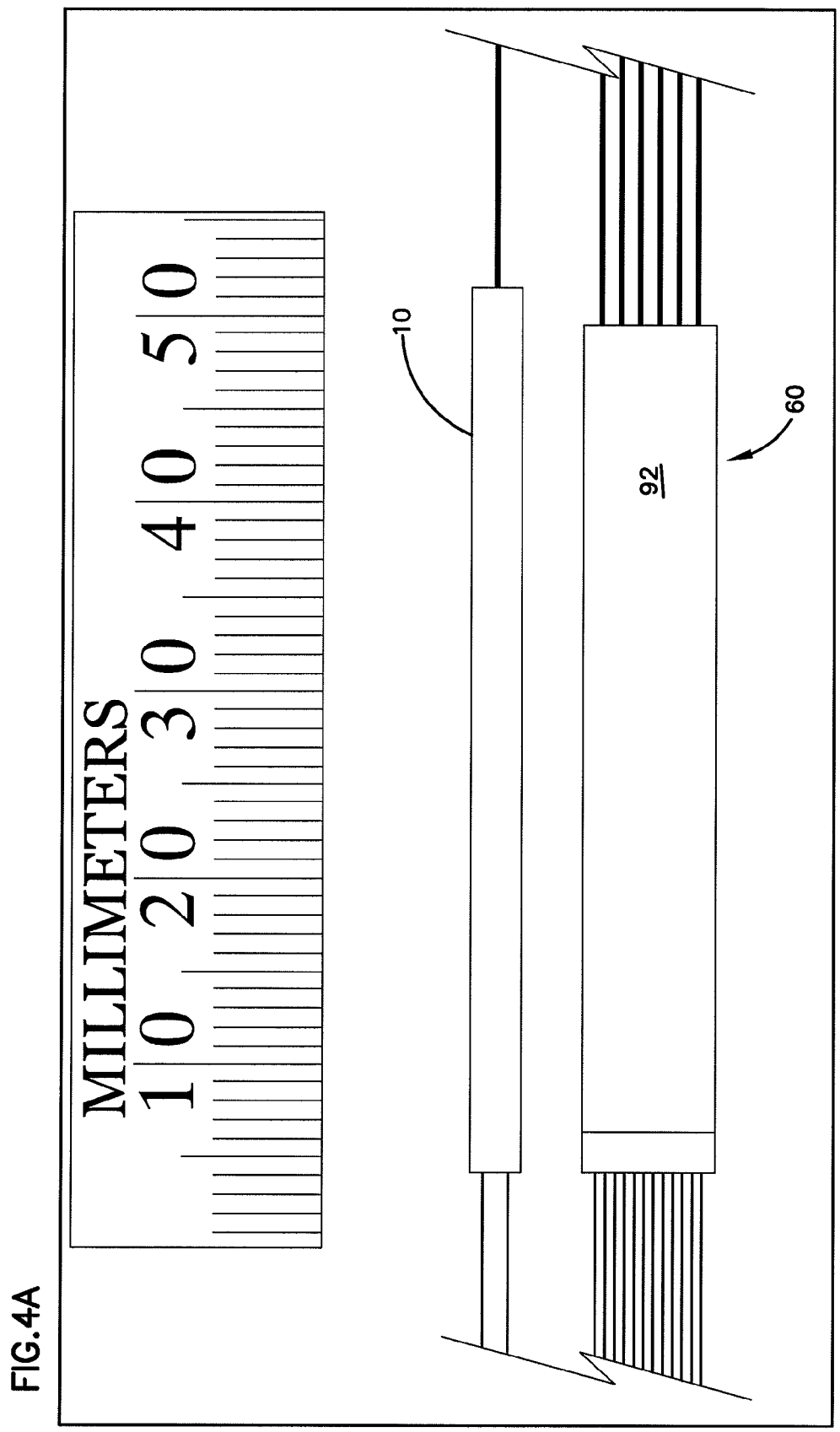
FIG. 4A illustrates a comparison of a preferred embodiment of an integrated packaged splitter assembly in accordance with the present invention and a prior art splitter.

In an embodiment, the optical splitter assembly has fiber in the 250 μm to 3 mm range for wavelengths of 980-1625 nanometers. In one embodiment, the splitter assembly 60 is used with sorted wavelengths of 1310 nanometers and 1550 nanometers. In this particular embodiment, the 1550 nm wavelength carries broadband data and the 1310 nm wavelength carries narrow band data. It is recognized that the splitter assembly 60 can be tailored for any conventional optical wavelength. While the embodiment illustrates 4 port splitters, it is recognized that the splitter assembly 60 can have three port splitters as shown in FIG. 4A or a five or more port splitters. It is also recognized that varying diameter of fibers and different wavelengths can be used within one splitter assembly 60.

FIG. 4A illustrates the housing 92 of a preferred embodiment of a splitter assembly 60 in accordance with the present invention. A splitter constructed with the prior art conventional packaging 10 is shown at the top. The rectangular brass component directly below the prior art package 10 represents the integrated packaged splitter assembly 60 housing six (6) splitters all disposed on a single substrate in accordance with the present invention. The integrated splitter assembly 60 is considerably more compact than six of the prior art single splitter packages illustrated in FIG. 2. The splitter assemblies 10 of FIG. 2 each have an input fiber 44 and a pair of output fibers 46. In that each splitter assembly 10 is distinct, the input and output fibers 44 and 46 cannot be organized prior to assembly. In contrast, if the requirement includes the organization of the input 64 or output leads 66 with respect to the splitter 62 of FIG. 4A, the leads are all juxtaposed within the package so that they can all be easily arranged, ribbonized, or otherwise easily organized. Prior art multiple individual stainless steel tubes 18 are often more expensive than the single package surrounding the integrated structure.

Figure 2:
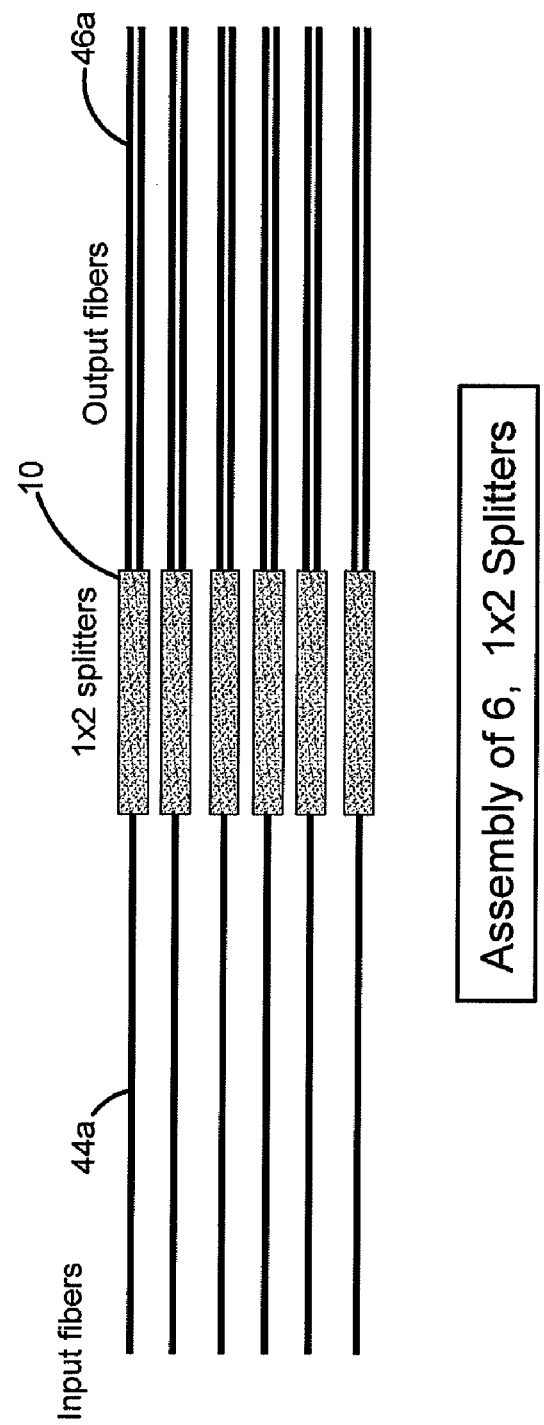
FIG. 2 illustrates multiple prior art splitter assemblies disposed in a system.

By way of an example of the compactness, the dimension of the conventional packaging 10 shown in FIG. 1 and FIG. 2 has a diameter of approximately 0.115 inches. Therefore, if six of the conventional packaging 10 is placed adjacent to each other, it would take a minimum of approximately 0.69 inches.

In contrast, the splitter assembly 60 shown in FIG. 4A has a width of approximately 0.312 inches. Therefore, the splitter assembly 60 of the present invention can fit in excess of twice as many splitters in the same area. It is noted that the height or depth of the splitter assembly 60 is approximately 0.2 inches, slightly larger than the depth of the conventional packaging 10 of 0.115 inches.

Figure 4B:
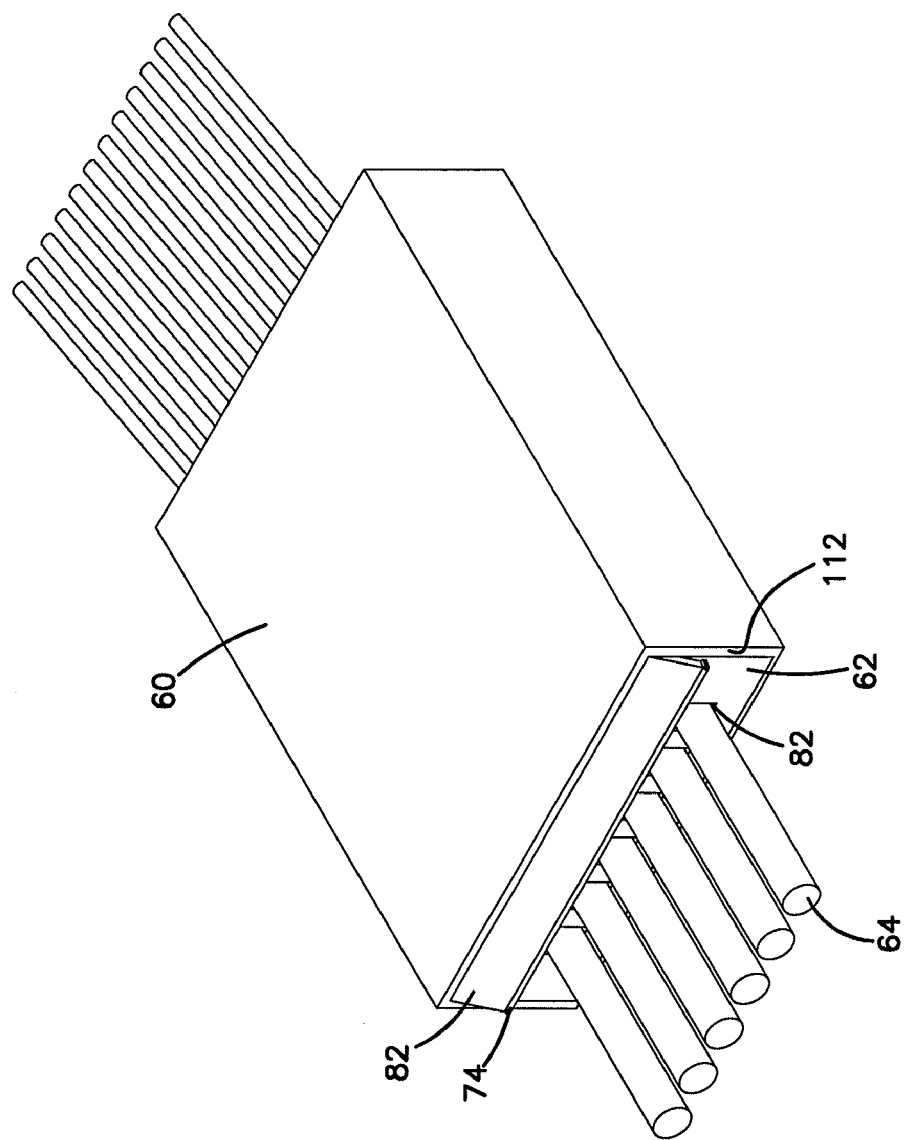
FIG. 4B is a perspective view of an integrated splitter assembly in accordance with a preferred embodiment of the present invention.

Referring to FIG. 4B, a perspective view of the splitter assembly 60, the splitter assembly 60 has a common substrate 62 from which the fibers 82 overlay and are coupled/split in the coupling region 68, as shown in FIG. 3A. In FIG. 4B, the inputs 64 are shown projected outward from the splitter assembly 60. The splitter assembly 60 has the adhesive 74 overlying the fibers 82 to secure them to the common substrate 62. The splitter assembly 60 has a second substrate or top cover to overlay the fibers 82. The housing 112 encircles the common substrate 62, fibers 82, and the upper substrate to protect the fibers in the coupling region 68.

Figure 5A:
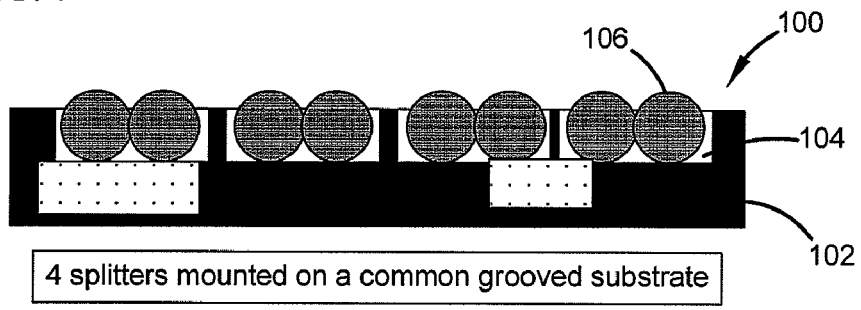
FIG. 5A is a preferred embodiment of a splitter assembly including a plurality of splitters disposed on a common grooved substrate in accordance with the present invention.

The integrated splitter assembly 100 in accordance with a preferred embodiment of the present invention can also be constructed by using a substrate 102 which is grooved as illustrated in FIG. 5A. The plurality of grooves 104 each receive one of the coupling region 68 of a splitter. In a preferred embodiment, the grooves may be of arbitrary shape but can be, without limitation, rectangular, triangular, or polygonal in shape. The fibers 106 are disposed in a groove 104 in the integrated splitter assembly 100. In a preferred embodiment, the grooves 104 may be deep enough to fully encompass the fibers or in an alternate embodiment, the grooves may only partially encompass the fibers. The grooves 104 offer the advantage of allowing the couplers to be precisely positioned on the substrate. They also allow the adhesive bonding of the splitters to the substrate to be localized to the specific location where the splitter is being bonded. Other embodiments include the use of materials other than fused silica or quartz as the substrate material. In general, fused silica or quartz are chosen because they have a thermal expansion coefficient which is similar to that of the optical fiber. Any other rigid material having a similar thermal expansion coefficient is suitable. The only constraint on the expansion coefficient is that the substrate not cause the fibers or splitters to break when the assembly is cycled through the operational temperature or if the assembly is stored for a prolonged time at a temperature extreme.

Figure 5B:
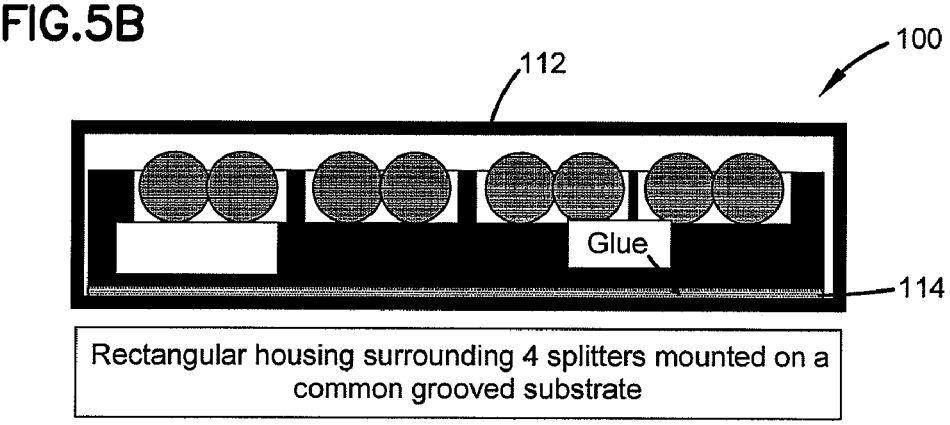
FIG. 5B is another preferred embodiment of an integrated splitter assembly including a housing in accordance with the present invention.
Figure 5C:
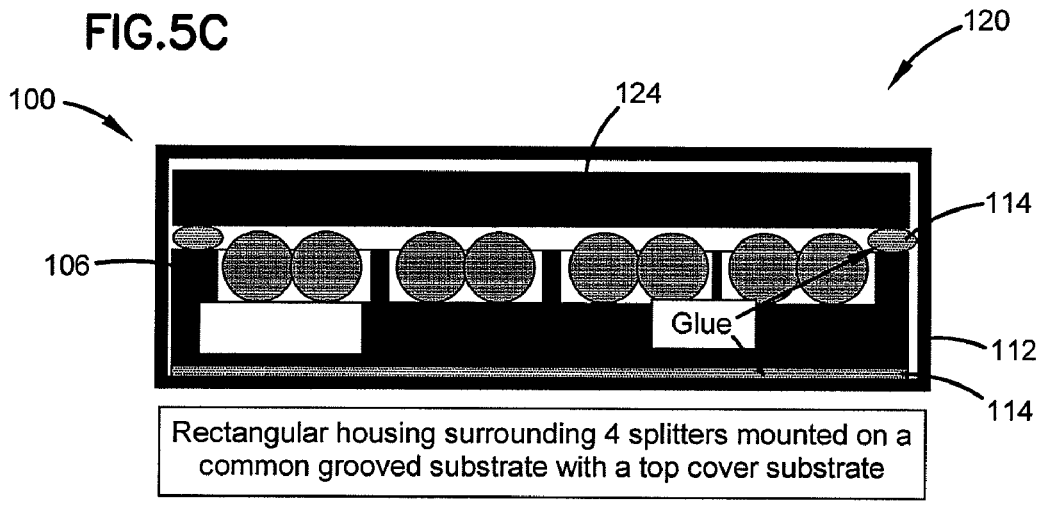
FIG. 5C is another preferred embodiment of an integrated splitter assembly including a substrate disposed as a cover in accordance with the present invention.

FIG. 5B illustrates another preferred embodiment of an integrated splitter assembly 100 including a housing 112. An adhesive or glue 114 is used to couple the substrate to the housing 112. A top cover 124 or secondary substrate on top of the fibers 82 of the splitter array 106 can be added prior to being enclosed in the housing 112 as illustrated in FIG. 5C to reduce the exposure of the assembly to environmental effects and to increase the resistance of the splitter to mechanical shocks and vibration.

Figure 6:
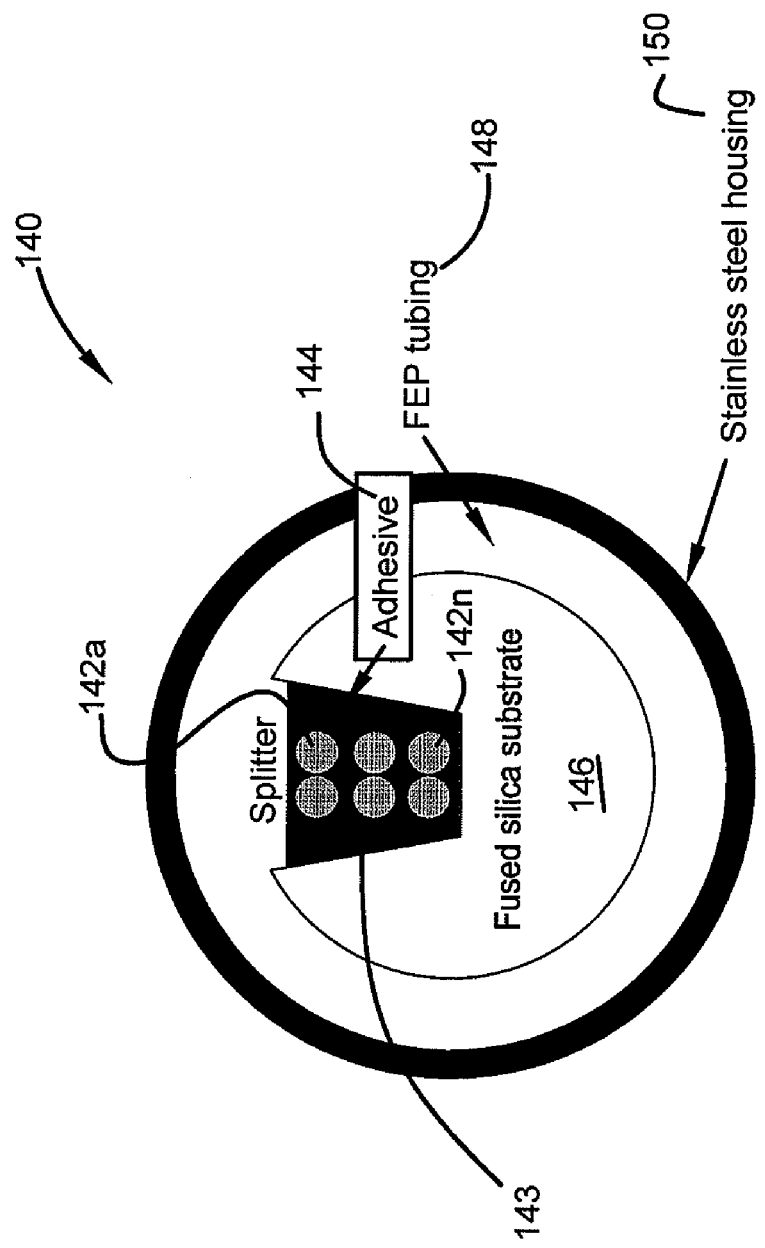
FIG. 6 is a preferred embodiment of an integrated splitter assembly including a plurality of splitters in accordance with the present invention.

Another preferred embodiment illustrated in FIG. 6 is an integrated splitter assembly 140 wherein several splitters 142 are fabricated and mounted in the same substrate 146 as is used in the configuration of a single splitter as illustrated with respect to FIG. 1. In this preferred embodiment, a channel 143 in the round substrate 146 may be sufficiently deep to allow several splitters 142a-n to be adhesively attached or more particularly, glued, for example, with epoxy, one on top of the other. The integrated splitter assembly 14-0 has a FEP tubing 148 to provide protection from contamination or damage. A stainless steel tubing or housing 150 encircles the FEP tubing 148.

In one embodiment, the channel is approximately 0.020 inches by 0.020 inches. The fused silica substrate 146 has an outer diameter of 0.068 inches. The FEP tubing 148 has an outer diameter 148 of 0.073 inches. The housing 150 has an outer diameter 150 of 0.115 inches.

Figure 7:
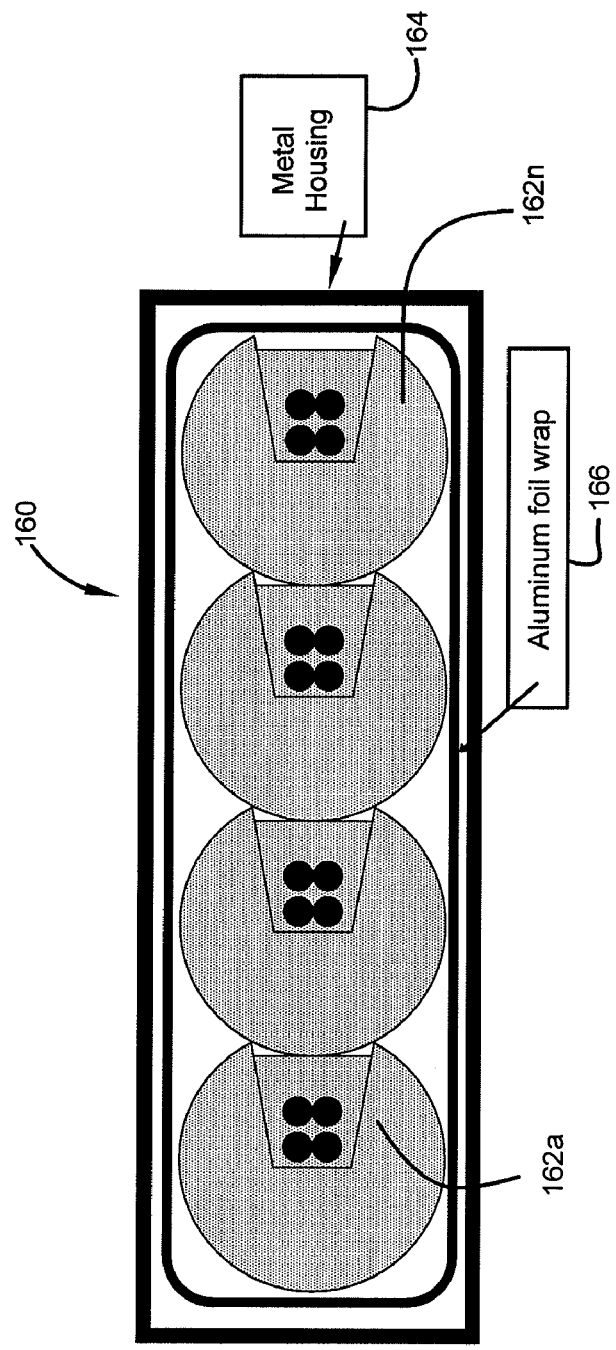
FIG. 7 is a particular preferred embodiment of a plurality of integrated splitter assemblies disposed in a housing in accordance with the present invention.

FIG. 7 is another preferred embodiment of a splitter assembly 160 including a plurality of integrated splitters 162a . . . n in accordance with a preferred embodiment. This particular embodiment illustrates an integrated splitter assembly for eight 1×2 splitters. It should be noted that the orientation of the individual splitter assemblies 162a . . . n may allow all the throughput fibers of each splitter assembly to be grouped in one direction and all the coupled fibers to be grouped in another direction.

Figure 8:
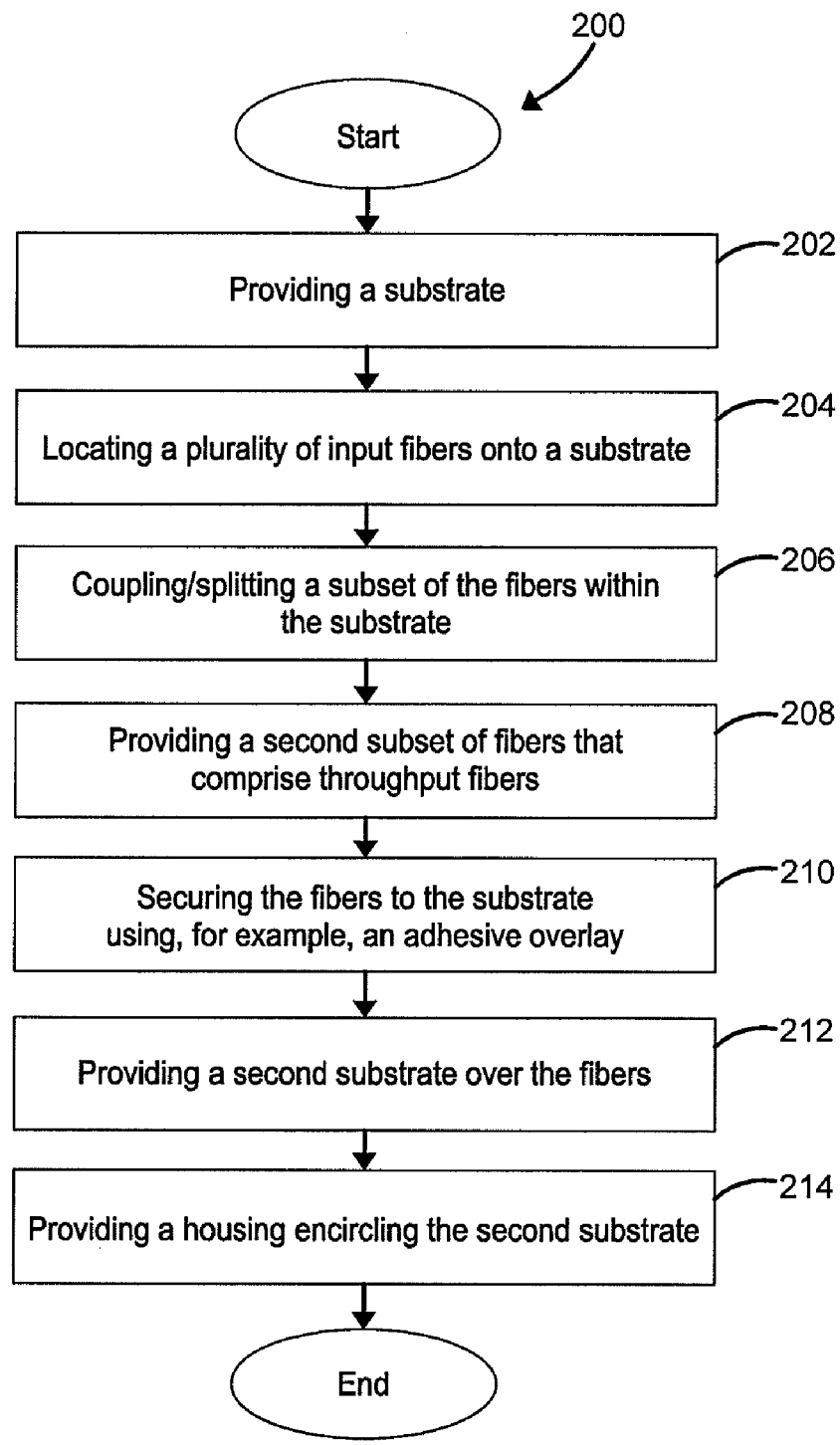
FIG. 8 is a flow chart illustrating a method to fabricate an integrated splitter assembly in accordance with a preferred embodiment of the present invention.

FIG. 8 illustrates a flowchart of a method 200 used to fabricate an integrated optical splitter system in accordance with a preferred embodiment of the present invention. The method includes the step 202 of providing a substrate such as, for example, fused silica substrate. A plurality of input fibers are located onto the substrate per step 204. A subset of the fibers is coupled and/or split per step 206. Splitting and coupling may be required between individual single fibers or may involve the simultaneous multiple coupling of a number of fibers in a cable. The splitting and coupling of the fibers can give rise to additional attenuation and the need to minimize such losses which sets maximum tolerance on any permitted mismatch at the fiber junctions. Mismatch may arise because of differences between two fibers to be joined in terms of numerical aperture differences, refractive index profile differences, or differences in core diameter or because of misalignment. These differences are minimized and further by the application of index-matched adhesives per step 210. Adhesives also secure the fibers onto the subset.

A subset of fibers forms the throughput fibers per step 208. A second substrate is provided over the fibers and substrate per step 212. A housing is then disposed over the second substrate per step 214.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

The claims should not be read as limited to the described order or elements unless stated to that effect. Therefore, all embodiments that come within the scope and spirit of the following claims and equivalents thereto are claimed as the invention.

what is claimed:

1. An integrated optical splitter assembly, comprising:
   a single substrate;
   a channel formed in the single substrate;
   a plurality of first optical fibers;
   a plurality of second optical fibers;
   a plurality of optical splitters affixed to the single substrate to form an integrated multi-splitter structure, each of the optical splitters configured to split optical signals passing between at least one of the first optical fibers and a plurality of the second optical fibers, wherein one or more of the plurality of optical splitters is positioned in the channel;
   a plurality of channels formed in the single substrate, the plurality of channels including the channel, and wherein each of the plurality of optical splitters is positioned within one of the plurality of channels.

2. The integrated optical splitter assembly of claim 1, further comprising an external housing substantially enclosing the assembly.

3. The integrated optical splitter assembly of claim 2, wherein the first plurality of optical fibers extends through the external housing on a first side and the second plurality of optical fibers extends through the external housing on a second side opposite the first side.

4. The integrated optical splitter assembly of claim 1, further comprising an adhesive bonding the plurality of first optical fibers and the plurality of second optical fibers to the substrate.

5. The integrated optical splitter assembly of claim 1, further comprising an adhesive bonding the plurality of splitters to the substrate.

6. The integrated optical splitter assembly of claim 1, further comprising a second substrate arranged to overlay the first optical fibers and the second optical fibers.

7. The integrated optical splitter assembly of claim 1, further comprising a rectangular metal tube at least partially encasing the substrate.

8. The integrated optical splitter assembly of claim 1, further comprising a plurality of grooves in the single substrate, each of the plurality of grooves arranged to at least partially receive a splitter from among the plurality of splitters.

* * * * *